(12) United States Patent
Kamp et al.

(10) Patent No.: US 10,667,374 B2
(45) Date of Patent: May 26, 2020

(54) CONTROLLED DEVICE AND METHOD FOR SETTING UP SAME

(71) Applicant: SIGNIFY HOLDING B.V., Eindhoven (NL)

(72) Inventors: Antonie Leonardus Johannes Kamp, Eindhoven (NL); Octavio Alejandro Santana Arnaiz, Eindhoven (NL); Leendert Teunis Rozendaal, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/324,952

(22) PCT Filed: Aug. 8, 2017

(86) PCT No.: PCT/EP2017/070029
§ 371 (c)(1),
(2) Date: Feb. 12, 2019

(87) PCT Pub. No.: WO2018/029176
PCT Pub. Date: Feb. 15, 2018

(65) Prior Publication Data
US 2019/0230773 A1 Jul. 25, 2019

(30) Foreign Application Priority Data
Aug. 12, 2016 (EP) .................................... 16184055

(51) Int. Cl.
*H05B 37/02* (2006.01)
*H05B 47/19* (2020.01)
(Continued)

(52) U.S. Cl.
CPC ............. *H05B 47/19* (2020.01); *G05B 15/02* (2013.01); *H04L 9/0869* (2013.01);
(Continued)

(58) Field of Classification Search
CPC ............ H05B 37/0227; H05B 37/0245; H05B 37/0272; H05B 37/0281
(Continued)

(56) References Cited

U.S. PATENT DOCUMENTS 6,505,243 B1 1/2003 Lortz
2002/0145394 A1* 10/2002 Morgan ............ H04L 29/12254
315/291
(Continued)

FOREIGN PATENT DOCUMENTS

WO WO2009027901 A2 3/2009

*Primary Examiner* — Tung X Le
(74) *Attorney, Agent, or Firm* — Akarsh P. Belagodu

(57) ABSTRACT

The invention relates to a controlled device (1, 1'), a system (25, 25') comprising such controlled device (1, 1') and a controller device (21), a method for setting up such controlled device (1, 1') and a software product for a set up processor (3, 3') of such controlled device (1, 1'). In order to allow the controlled device (1, 1') to persistently stay within the framework of the system (25, 25') over its power cycles while avoiding or at least reducing a need for a costly element like a NVRAM on the side of the controlled device (1, 1'). Rather than providing costly NVRAM in the controlled device (1, 1'), the controlled device (1,1') is just provided with fixed information which allows the controlled device (1,1') to receive or obtain the variable control data from the controller device (21) as an outside source.

13 Claims, 3 Drawing Sheets

(51) Int. Cl.

| | | |
|---|---|---|
| | *H04W 4/70* | (2018.01) |
| | *H04L 29/08* | (2006.01) |
| | *H04L 29/06* | (2006.01) |
| | *H04W 4/80* | (2018.01) |
| | *H04L 12/24* | (2006.01) |
| | *G05B 15/02* | (2006.01) |
| | *H04L 9/08* | (2006.01) |
| | *H04W 12/06* | (2009.01) |

(52) U.S. Cl.
 CPC ...... *H04L 41/0806* (2013.01); *H04L 63/0876* (2013.01); *H04L 67/125* (2013.01); *H04L 67/34* (2013.01); *H04W 4/70* (2018.02); *H04W 4/80* (2018.02); *H04W 12/06* (2013.01); *H04L 41/08* (2013.01)

(58) Field of Classification Search
 USPC ........................................ 315/152, 307, 312
 See application file for complete search history.

(56) References Cited

U.S. PATENT DOCUMENTS

| | | |
|---|---|---|
| 2005/0252970 A1 | 11/2005 | Howarth et al. |
| 2008/0297070 A1* | 12/2008 | Kuenzler ........... H05B 37/0272 |
| | | 315/308 |
| 2010/0106836 A1 | 4/2010 | Schreyer et al. |
| 2013/0001309 A1 | 1/2013 | Cavalcanti et al. |
| 2014/0022917 A1 | 1/2014 | Apte et al. |
| 2014/0177469 A1* | 6/2014 | Neyhart .............. H04L 12/2807 |
| | | 370/254 |
| 2016/0073474 A1 | 3/2016 | Van De Sluis et al. |
| 2017/0027043 A1* | 1/2017 | Greene ................ H03K 17/962 |

\* cited by examiner

CONTROLLED DEVICE AND METHOD FOR SETTING UP SAME

CROSS-REFERENCE TO PRIOR APPLICATIONS

This application is the U.S. National Phase application under 35 U.S.C. § 371 of International Application No. PCT/EP2017/070029, filed on Aug. 8, 2017, which claims the benefit of European Patent Application No. 16184055.8, filed on Aug. 12, 2016. These applications are hereby incorporated by reference herein.

FIELD OF THE INVENTION

The present invention relates to a lighting device, a system comprising such lighting device and a source for control data, a method for setting up such lighting device and a software product for a set up processor of such lighting device.

BACKGROUND OF THE INVENTION

An example of a controlled device may be found in the connected lighting landscape, where connected lamps or lighting devices are controlled by a central unit. In the connected lighting landscape, there is an ongoing price battle mainly for connected (tunable) white dimmable lamps. For these lamps, the volumes are expected to become very large which makes the Bill of Material (BOM) cost very important. Currently one is already at a point where connectivity is a significant factor of BOM cost in a connected white dimmable lamp.

Such cost advantages might also be beneficial to other lights (color lamps, luminaires etc.).

An important cost driver for such a device/product is non-volatile random access memory (NVRAM, e.g. flash memory). Reasons for this include its relatively large (semi-conductor) area and additional mask steps needed in production.

Not having to include such cost driver, i.e. to provide a chip without any NVRAM but only non-volatile read only memory (ROM) might be very cost advantageous.

However, a connected light (or any other example of a controlled device) is not always powered.

Conventionally, in order to avoid a need for a fresh configuration process entering the connected light into the framework of the system each time the connected light is powered up again, NVRAM is used to make sure that the connected light maintains the configuration information and thus stays part of a wireless network (in particular "remembers" the access to the wireless network) and is provided with application features which persist over power cycles. For example a light may persistently store a network address, network security key and frame counter to operate in a secure network and it may store scenes, groups, last light state for light control and other information. Often it also can store a new version of its own program to be software upgradable.

A straightforward approach on avoiding a need for frequent fresh configurations might include avoiding the (complete) powering down of the controlled device altogether, e.g. by means of a separate small power source powering only the always static or dynamic random access memory. However, such approach is neither efficient in terms of power consumption, use of resources, product lifetime or price nor even feasible under many conditions.

SUMMARY OF THE INVENTION

It is an object of the present invention to provide a lighting device, a system comprising such lighting device and a source of control data, a method for setting up such lighting device and a software product for a set up processor of such lighting device, which allow the lighting device to persistently stay within the framework of the system over its power cycles while avoiding or at least reducing a need for a costly element like a NVRAM on the side of the lighting device.

In a first aspect of the present invention a lighting device is presented, comprising a set up processor for carrying out a set up of the lighting device, identification data which identifies the lighting device, a communication unit, a volatile memory for storing control data, and a controller for controlling, after the set up is completed, an operation of the lighting device in accordance with control data stored in the volatile memory, wherein the set up carried out by the set up processor includes, upon powering up of the lighting device, receiving, using the identification data, control data via the communication unit and storing the received control data in the volatile memory.

According to this aspect, when the lighting device is powered up, originally no control data is available to the controller, as such information is not maintained by the volatile memory between power cycles. The set up processor, however, uses the identification data (which, as it does not need to be changed can be stored in non-volatile ROM or the like) to obtain the control data for the controller via the communication unit, so that the control data can be stored (until the next power-down) in the volatile memory and is readily accessible to the controller.

This invention proposes a way to store non-volatile data on a more powerful (expensive) node on the wireless network. Such a node is typically already part of a connected lighting system (e.g. a smart bridge). In case the goal is to not have any NVRAM (i.e. NVRAM on the other (central) node is a replacement, not an extension), even a (secure) setup of the network itself can be done without requiring any NVRAM in the lighting device.

An insight realized by the inventors is that it is possible to (at least partially or even fully) replace the NVRAM of multiple connected lighting devices in a system by an NVRAM (or other memory) on a single more powerful (or always-powered) node in the wireless network, in such a way that—given the appropriate functionalities are provided—the lighting device can still be commissioned to be part of a secure wireless network (where the control data is needed for the system behavior, while the lighting device can still access its own non-volatile data) and—from a user perspective—the lighting device still has similar features as a connected light with NVRAM and/or works in existing connected lighting systems.

Rather than providing costly NVRAM in the controlled device, the lighting device is just provided with (fixed) information, e.g. stored in a non-volatile read-only memory, which allows the lighting device to receive or obtain the (variable) control data from an outside source.

In a preferred embodiment, the set up carried out by the set up processor includes transmitting the identification data via the communication unit.

By transmitting the identification data, e.g. a serial number or the like, the lighting device not only indicates its presence but also allows the recipient of the identification information to identify the lighting device, such that the control data specific to the lighting device may be transmitted to the lighting device.

The transmission may be limited to a particular mode or channel or may include a multitude of channels, wherein after transmission in a particular channel, the lighting device "listens" for a response.

In a preferred modification of the above embodiment, the lighting device further comprises a security key, wherein the set up carried out by the set up processor includes using the security key to authenticate a source from which the control data is received.

The use of a security key allows avoiding that in an unauthorized way or unintended manner control data can be transmitted to the lighting device, as the lighting device can make sure, by using the security key, that the source of the control data (e.g. the controller device sending the control data) is a proper source, at least in the sense that the source is also in possession of the security key or information related thereto. In addition, the messages can be encrypted to make their content confidential.

The term "security key" is not be understood as limited to a particular piece of abstract data, e.g. binary information, which is inputted into a suitable algorithm, as the "security key" may also be realized, for example, by means of a circuit or logic structure, in which the function of the key is embedded.

The security key may have a dual purpose insofar as it may be used for encryption and/or for authentication.

An implementation of the invention may as well provided without making use of a security key at all (e.g. in an environment where unintended or unauthorized control data transmission are not of concern), while the security key, if provided, does not necessarily have to be provide a high level of security, e.g. the security key may be just a few bits long. Depending on the sensitivity of the implementation, the strength of the security key may be made as strong as needed or desired, e.g. by increasing its length and/or providing a more complex security algorithm.

In a preferred implementation of the above modification, the lighting device further comprises a random data generator, wherein the authenticating of the source includes transmitting a random data generated by the random data generator to the source, receiving an encrypted random data from the source and comparing the transmitted random data with the encrypted random data using the security key.

In case the security key is a symmetric encryption key, for example, the source (e.g. the controller device, see below) uses the security key, which it may have previously obtained by some means from the lighting device (see below) to encrypt the random data (e.g. a random number), provided as a challenge to the source by the lighting device, and transmits the security result to the lighting device. The lighting device then uses the (original) security key to decrypt the encrypted transmission, so to compare the original random data with the data obtained by decrypting. As an alternative, the security key may also be used by the lighting device to obtain also an encrypted version of the random data, so that the encrypted version and the received data may be compared.

In case of an asymmetric approach, e.g. the use of a public/private key pair, the lighting device may use a public key provided for the purpose of transmitting the random data to encrypt the random data, so that the transmitted encrypted random data can be decrypted by a source for the control data, which then can return the random data. Here, it is additionally possible that the source uses a public key of a further public/private key pair to encrypt the received and decrypted random data and transmits the result to the lighting device, which may then use the corresponding private key to decrypt the transmission, thus that source and lighting device are mutually authenticated.

The purpose of the challenge in form of random data is to prevent play-back attacks on the communication between the source of the control data and the lighting device.

The randomness of the random data, as it will be appreciated by the skilled person, may be provided in view of the circumstances. It may, for example, be sufficient that the random data is not truly random in a mathematical sense and the random data generator may as well be a pseudo random data generator.

In a preferred embodiment, the set up carried out by the set up processor includes transmitting type information indicating a type of the lighting device together with the identification data.

The type of the lighting device, which may, for example, determine the details and the extent of the controlled data needed by or useful to the lighting device, may be derived from a list correlating the identification data with such types. By providing the type—possibly as a part of the identification data—in the transmission from the lighting device, the need for such list would be reduced to a much smaller list in which only the type and the influence of the type of the control data to be transmitted is indicated.

In a preferred embodiment, the receiving of control data includes receiving data and identification information from a source, wherein the set up processor stores the received data as control data in the volatile memory in case the identification information and the identification data match.

As an alternative to the transmission of the identification data (possibly together with additional information as discussed above), it is also foreseen that the lighting device "listens" for a transmission of the control data, which can be identified by the lighting device as being indeed intended for the lighting device by checking the identification data of the lighting device provided in addition to the data in the transmission received by the lighting device. Due to the possibility of identifying the correct control data for the lighting device, the source of the control data may (in sequence and/or in parallel) provide control data for multiple lighting devices (e.g. by means of a regular broadcast of the information for those lighting devices which are registered with the source but not yet in communication with the source or the overall system).

The term "match" does not necessarily imply that the identification information and the identification data are (completely) identical, as the invention may also include that control information for a group of lighting devices is provided commonly, so that the lighting device recognizes a match in case it belongs to the group identified by the identification information.

Corresponding measures for improving the security of the communication as discussed above may also be provided in this context.

In a preferred embodiment, the identification data is unique to the lighting device.

Providing unique identification data, e.g. ensured already in the manufacturing of the lighting devices, guarantees that there will be no collision between multiple lighting devices having the same identification data. However, it is also foreseen that there might be a more limited list of possible identification data, which may give the benefit that the identification data, e.g. a ID number, can be implemented with a more limited range, e.g. as an 8 bit number.

In a preferred embodiment, the set up processor includes a microprocessor and a non-volatile read-only memory storing a set up program to be carried out by the microprocessor.

Even though there are other way of implementing the set up processor (e.g. by means of a dedicated circuitry), the use of a microprocessor and non-volatile read-only memory providing a program allows for a quick implementation using basically existing technology, while in particular the provision to the program in the memory makes it possible to change such program for a different product cycle without need for a possible complex re-design.

In a preferred modification of the above embodiment, the read-only memory includes a one-time programmable memory and/or a mask ROM.

The use of a one-time programmable memory gives the benefit that basically the same structure may be used for different controlled device, wherein in the programmable memory the proper program is stored. A mask ROM is one of the most cost effective ways to implement the memory, while, however, the mask ROM needs to be redesigned for changes in the set up program.

In a preferred embodiment, the identification data is stored in the read-only memory.

For example, in the case of using mask ROM for the read-only memory, the identification data (and if provided, the security key) may be provided by selectively severing connections or fuses or some other way of preferably permanently modifying hardware, so to code data into the hardware.

In a preferred embodiment, the lighting device comprises a lighting unit, wherein the set up carried out by the set up processors includes, prior to receiving the control data, transmitting the identification data by means of a coded light emission of the lighting unit.

The present invention is particularly suitable for providing a lighting device in a connected lighting landscape with an alternative to (or at least partial replacement of) non-volatile random access memory. In the case of a lighting device, the lighting unit may be used for a particular transmission means (e.g. by coding information in the light, e.g. by modulation of the light intensity (e.g. on-off, or percentages), by changing the light color or the like, etc.), so to communicate identification data and, if applicable, additional data like a security key, e.g. a (symmetric) encryption key (or a public key of a public/private key pair) without using the communication unit, which typically provides for a wireless communication. This may reduce the chance of "eavesdropping" of the identification data (and security key) in case of a transmission thereof on the typically more far reaching wireless communication.

It might be beneficial to provide the coded light emission only upon a particular trigger (e.g. operation by a user on the device) or after a certain number of attempts or period of time in which an otherwise expected transmission of control data does not happen.

It is also foreseen that the present invention may be realized in contexts where previously—for example for cost reasons in view a conventional need for NVRAM—no connectivity/controllability was provided.

In a further aspect of the present invention, a system is presented, comprising at least one lighting device according to the invention and a source for transmitting control data to the controlled device.

In a preferred embodiment, the source is provided with a reader for reading identification information and/or a security key from the lighting device.

As discussed above, an option for transmission of data from the lighting device to the source (e.g. a controller device) is the use of coded light emission, in which case the reader would be provided to pick up such coded light emission. Another way of providing such information may include providing the information in readable form on the controlled device itself, e.g. in form of a one- or two-dimensional barcode (e.g. QR-code) and/or in form of an RFID tag, such that it can be read by a suitable reader of/for the source. The reader may be included in the source (e.g. the controller device), while it also may be a separate device, e.g. cooperating with the source only temporarily, i.e. for the setup.

The security key is typically only transferred to the source (or central node) once, i.e. in the context of the initial setup of the controlled device. From then on a new (further) key, which may be called "network key", will be known by the lighting device(s) and shared between (other) nodes in the network such that they can all communicate with each other. Each time a controlled node power cycles, it needs to get this network key again from the central controller node or source (which is possible because this node has the controlled devices unique security key). From then on, again, all communication uses the network key which is shared by all devices on the network.

In other words, while the security key is preferably specific and unique to the respective controlled device, the network key is specific to the network in which the controlled device is provided and is used for "regular" communication within said network, as in the conventional systems discussed above.

It is noted that a central node (in the sense of a central control instance or a controller device) of a system in which the present invention is implemented may or may not also have the function of the source for the control data. It is also possible that a separate device provides the control data to the controlled device (while this separate device may be dedicated to just this function) and/or that there are several devices functioning (either independently or in combination) as the source of the control data, possibly providing redundancy in the provision of the control data.

In another aspect of the present invention, a method for setting up a lighting device is presented, the lighting device comprising a set up processor, identification data which identifies the controlled device, a communication unit, a volatile memory for storing control data, wherein control data stored in the volatile memory is used by a controller of the lighting device, after the set up is completed, for controlling an operation of the lighting device, wherein the method comprises, as steps carried out by the set up processor, receiving, upon powering up of the lighting device and using the identification data, control data via the communication unit, and storing the received control data in the volatile memory.

In a further aspect of the present invention a computer program or software product is presented for carrying out a set up process of a lighting device, the software product comprising program code means for causing a set up processor to carry out the steps of the method for setting up a lighting device according to the present invention when the software product is run on the set up processor of the lighting device according to the present invention.

It shall be understood that the lighting device of claim 1, the system of claim 12, the method for setting up a lighting device of claim 14, and the computer program of claim 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
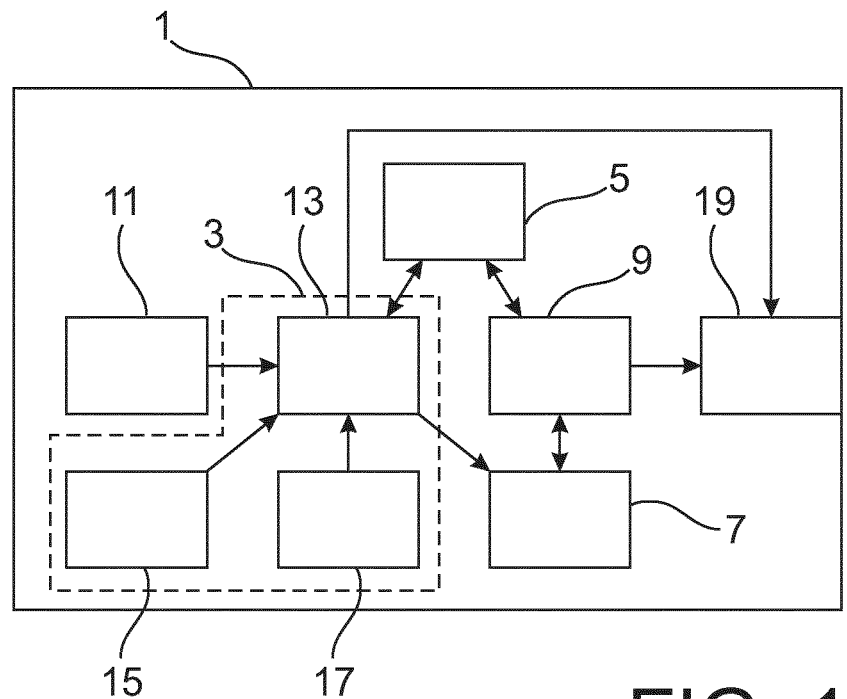
FIG. 1 schematically shows a controlled device in accordance with an embodiment of the invention, FIG. 2 schematically shows a controlled device in accordance with another embodiment of the invention, FIG. 3 schematically illustrates a system including controlled devices and a controller device in accordance with an embodiment of the invention.

FIG. 1 schematically shows a controlled device 1 in accordance with an embodiment of the invention.

The controlled device 1 includes a setup processor 3, a communication unit 5, a volatile memory 7, a controller 9, a random number generator 11 and a lighting unit 19.

The controlled device 1 is a lighting device provided for being embedded in a lighting system, in particular in a connected light landscape.

The setup processor 3 includes a microprocessor 13, a mask ROM 15 and a hardware encoded signature 17.

Upon powering the controlled device (read: lighting device) 1, the setup processor 3 and more specifically its microprocessor 13 carries out a program stored in the mask ROM.

In the course of this program, the microprocessor reads the signature 17 and derives therefrom identification data and a security key, while the signature 17 may also provide information of a type of the controlled device 1. The setup processor 3 causes the communication unit 5 to transmit the identification data together with a random number generated by the random number generator 11.

This transmission is provided, in succession, over the plurality of channels available to the controlled device, wherein each transmission is followed by a period during which the controlled device listens for an answer.

In case such answer is received, the setup processor 3 checks whether the sender of the answer may be authenticated by means of the security key. The transmission should include the random number previously transmitted in encrypted form, which the setup processor 3 decrypts by means of the security key, so to check for whether or not the encrypted data matches the originally generated random number. If this would be the case, the sender of the answer is authenticated. Other approaches for authentication are also possible, as will be appreciated by the skilled person.

The setup processor 3 then further uses the communication unit 5 for receiving control data, which the setup processor 3 stores in the volatile memory 7. After completion of the receipt of the control data, the setup processor 3 passes control to the controller 9, such that a normal operation similar to a conventional corresponding device may be carried out. The operation may include storing to and/or reading further data from the volatile memory 7 by the controller 9 or reception and/or transmission of data by the controller 9 via the communication unit 5. In particular, the controller 9 controls the operation of the lighting unit 19. The operation may also or alternatively include receiving additional data from the controller device or from a different device included, for example, in the connected light landscape. Such additional data may be related to further aspects of the operation of the controlled device 1 (e.g. scenes of the light landscape), while not being necessary right away.

In the context of installing the controlled device 1 for the first time, it is in this embodiment necessary to provide the security key used for authentication and the identification data (possibly together with the information on the type of the controlled device) to a controller device (see below), as an example of a source providing the control data.

In order to achieve this transmission in a manner different from using the communication unit 5, the setup processor 3 is provided with control over the lighting unit 19 and causes, upon provision of a suitable trigger (e.g. the expiry of a particular period of time during which no response to the provided challenge is received), the lighting unit 19 to transmit the information by coded light emission.

In a different implementation, the setup processor 3 and the controller 9 may be combined in a single unit, e.g. a single CPU or the like.

Figure 2:
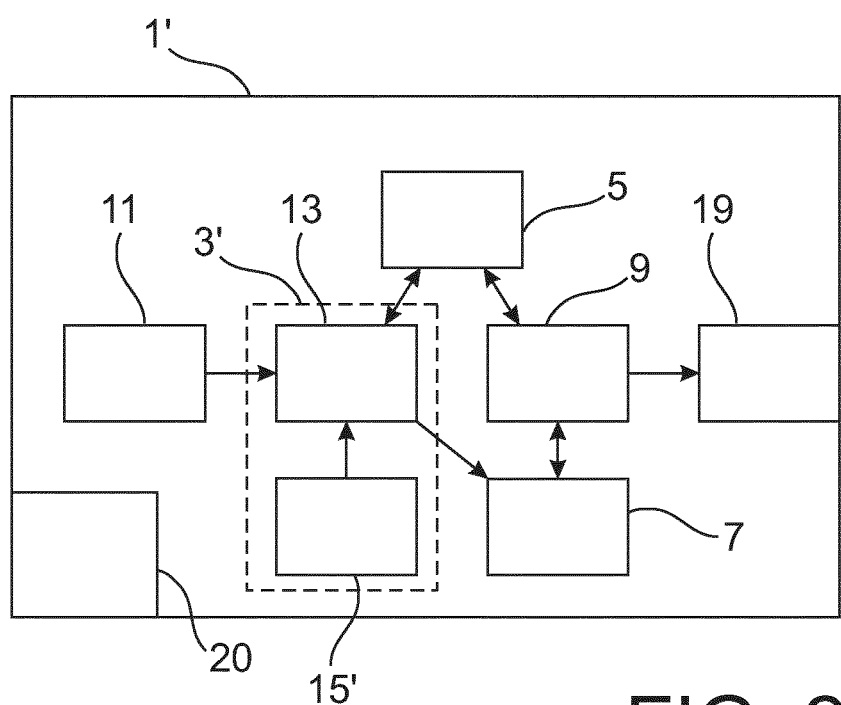

FIG. 2 schematically shows a controlled device 1' in accordance with another embodiment of the invention.

Similar to the controlled device 1 discussed above with respect to FIG. 1, the controlled device 1' illustrated in FIG. 2 includes a setup processor 3', a communication unit 5, a volatile memory 7, a controller 9, a random number generator 11 and a lighting unit 19. The communication unit 5, the volatile memory 7, the controller 9, the random number generator 11 and the lighting unit 19 correspond to those discussed above with respect to FIG. 1, so that a further description thereof is omitted.

Different from the embodiment illustrated in FIG. 1, the setup processor 3' includes a microprocessor 13 and a programmable read-only memory 15', wherein the program which is to be run on the microprocessor 13 is stored together with the signature including the identification data, the security key and the type of the device in the read-only memory 15'.

Furthermore, the setup processor 3' is not provided with control over the lighting unit 19.

In order to nevertheless allow access to the relevant information without having to use the communication unit 5, the controlled device 1' is provided with a tag 20, which includes the relevant information in a way that it can be read by a controller device, e.g. in form of a barcode (e.g. QR code) or RFID information.

Figure 3:
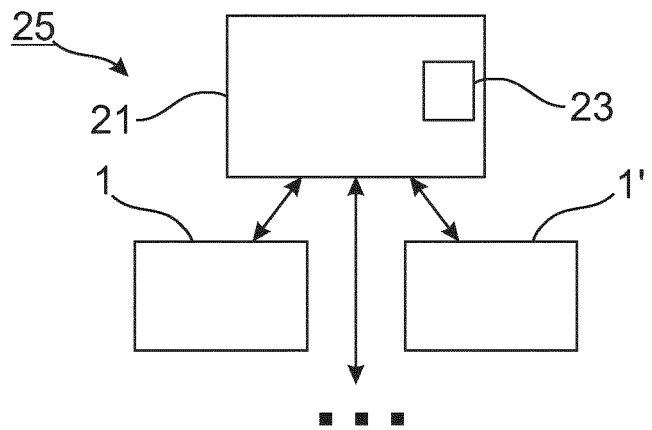

FIG. 3 schematically illustrates a system 25 including controlled devices 1,1' and a controller device 21 in accordance with an embodiment of the invention.

The controlled devices 1,1' (here only two devices are shown while the invention allows basically for any arbitrary number) correspond to those discussed above with reference to FIGS. 1 and 2.

The controller device 21 includes a reader 23 which is arranged to receive information used for the communication between the controller device 21 and the controlled devices 1,1'. The reader, depending on the particular embodiment of the controlled device 1, 1' used or intended to be used, may have the functionality of receiving coded light information, reading a barcode (e.g. QR code) and/or reading out an RFID tag, as well as other corresponding or similar functionalities.

The controlled device 21 is provided with the control data for each of the controlled devices 1,1' and transmits this information to the controlled devices 1,1' according to the present invention for storing in the respective volatile memory 7 of the controlled device 1,1'.

Figure 4:
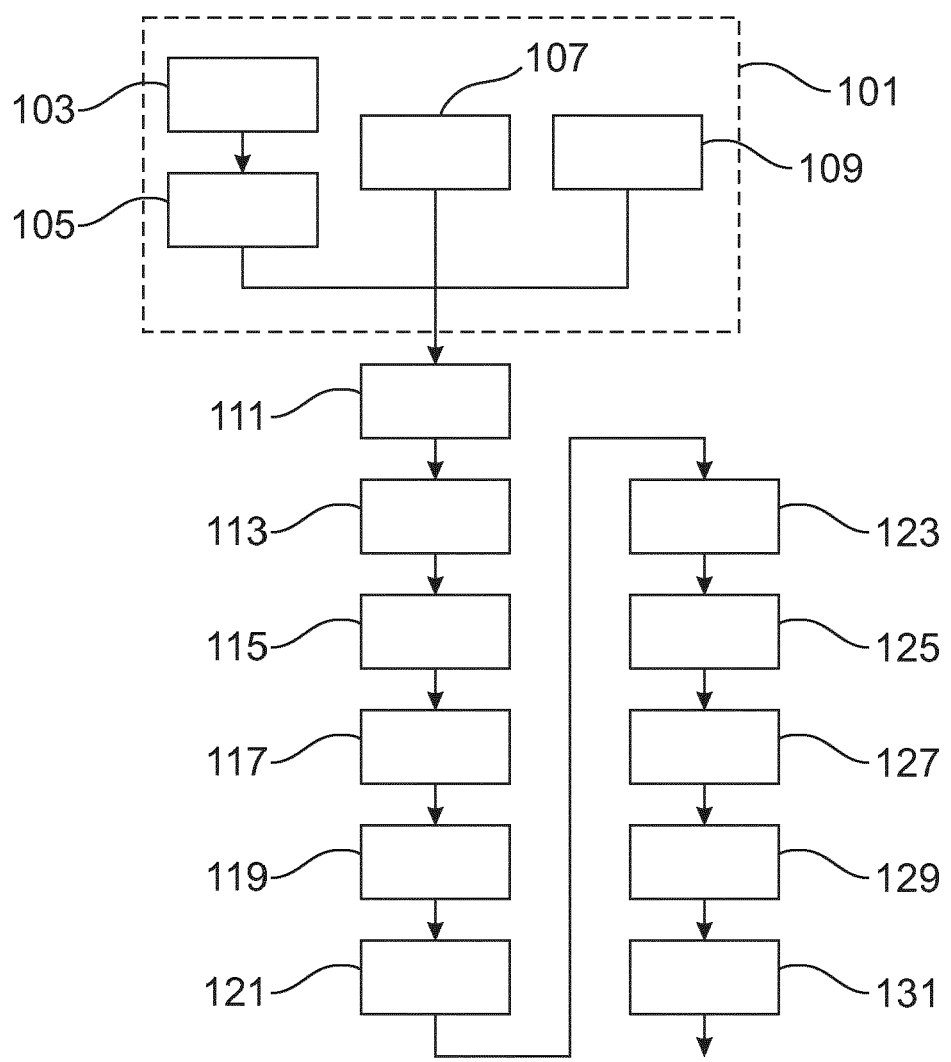
FIG. 4 shows a flow diagram illustrating a method for setting up a controlled device in accordance with an embodiment of the invention.

FIG. 4 shows a flow diagram illustrating a method for setting up a controlled device in accordance with an embodiment of the invention.

As a preliminary setup procedure a first step 101 is provided, which may include different approaches, either as alternatives or in combination.

Based on a particular trigger 103, in step 105, the controlled device transmits the information on the identification data and the security key by means of coded light emission. In step 107, such information is read out by the controller device from a barcode (e.g. QR code) or the like. In step 109, the information is received from an RFID tag provided on the controlled device.

Further alternatives to the receipt of such information by means of reading out an RFID tag and the optical reading of a barcode or the like (e.g. a QR-code) include a manual input of a code (e.g. printed on the controlled device or provided separately) by a user and/or other ways of communication between the controlled device (or any other unit having the relevant information) and the controller device, e.g. by means of near field communication.

If there is no need for a separate communication path or channel (like bar code (e.g. QR), RFID, NFC, coded light, manual entry) for transmission of the information on the identification data and the security key, the controlled device may be designed such that, for example, during a short period after an initial power up (and/or controlled by a switch operable by a user or the like) this information (preferably encrypted with a key known to the controller device/source) is transmitted from the controlled device via its communication unit.

In step 111, the controlled device is powered up (again— in case of steps 103 and 105 the controlled device was already powered up (it is possible, however, to provide that in case of steps 103 and 105, step 111 is omitted in the sense that after the coded light emission the controlled device proceeds to the steps for receiving the control data without need for a further power cycle—this may possibly include a loop insofar as the failure to receive control data after a certain amount of time is considered by the controlled device as the trigger 103). In step 113, a random number is generated, which is transmitted together with the identification data of the controlled device in step 115. In step 117, such transmission is received by the controller device.

The previously provided security key corresponding to the identification data is used by the controller device in step 119 to generate a response to the challenge provided by the random number. This answer is transmitted to the controlled device together with control data (which might or might not be also encrypted using the security key) in step 121 and received by the controlled device in step 123.

In step 125, the controlled device checks whether or not the originally transmitted random number matches the random number derived by decryption using the security key from the transmission from the controlled device.

If this would be the case, the additional control data also transmitted is stored in step 127 in the volatile memory. Furthermore, in step 129, optionally additional or further data is received by the setup processor via the communication unit, followed by regular operation in step 131 of the controlled device.

Figure 5:
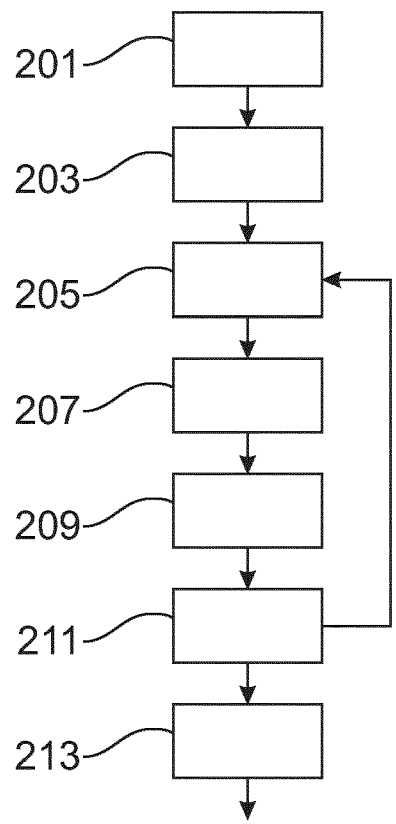
FIG. 5 shows a flow diagram illustrating a method for setting up a controlled device in accordance with another embodiment of the invention.

FIG. 5 shows a flow diagram illustrating a method for setting up a controlled device in accordance with another embodiment of the invention.

The initial setup process for allowing authentication of the controller device to the controlled device in step 201 is similar to step 101 discussed above.

In step 203 the controller device transmits identification data together with encrypted data. The encrypted data includes the identification data and at least a portion of the control data. Other ways for protection against, for example, replay attacks may be used.

In step 205, the transmission is received by the controlled device and provided the identification data in the plain format transmitted matches the identification data of the controlled device, a check is provided in step 207 by decrypting the encrypted data and checking for the matching identification data. If indeed the authenticity of the data is thus validated, in step 209, the (partial) control data is stored in the volatile memory.

In step 211, it is checked whether the complete control data is already received. If not the complete control data is received, the process returns to step 205. If indeed all control data is already stored in the volatile memory, the control of the controlled device is passed on to the controller of the controlled device, which then carries out regular operation of the controlled device in step 213.

Figure 6:
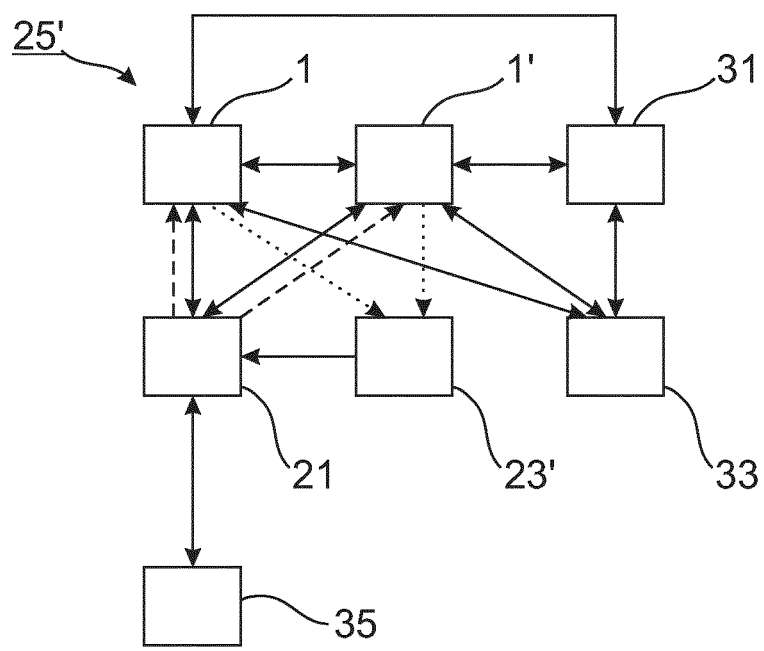
FIG. 6 illustrates interactions between different elements of a system including controlled devices according to an embodiment of the invention.

FIG. 6 illustrates interactions between different elements of a system 25' including controlled devices 1,1' according to an embodiment of the invention.

The system 25' is a connected lighting system and includes a controlled device 1 as illustrated in FIG. 1, a further controlled device 1' as illustrated in FIG. 2 and a conventional lighting device 31. This combination is provided merely for illustrative purposes and should not be understood a limiting the invention.

In addition to the controlled devices 1,1' and the conventional lighting device 31, the system 25' further comprises a controller device 21, a reader 23', an additional control unit 33 and a smart phone 35.

The reader 23', similar to that illustrated in FIG. 3, except being provided separately from the controller device 21, is provided to receive information used for the communication between the controller device 21 and the controlled device 1,1' (illustrated by dotted arrows) and provides this information to the controller device 21.

The controller device 21 provides the control data to the controlled devices 1, 1' (illustrated by the dashed arrows), so that eventually the controlled devices 1, 1' are holding the relevant control data, just as such control data is held by the conventional lighting device 31 having a non-volatile random access memory, in which the control data is stored and kept after setting up the conventional lighting device 31 in the system 25' (not further discussed here).

In particular, the control data may include the network key which allows communication between elements of the system 25'.

In their functionality, once provided with control data, the controlled devices 1,1' can completely corresponds to the conventional lighting devices in a conventional connected lighting landscape.

In this case, the controlled devices 1,1' and the conventional lighting device 31 are able to communicate with each other. Further, they are able to communicate with the control unit 33, which may be a switch or a dimmer control. Additionally, they are able to communicate with the controller device 21. These communication paths are illustrated by the solid arrows between the elements involved.

The smartphone 35 is able to provide commands to and to receive information from the controller device 21, which relays the commands to the controlled devices 1,1' and/or the conventional lighting device 31.

In such a system as illustrated in FIG. 6, at least three different functionalities are provided outside the controlled devices.

I. The first time adding of a new controlled device to the system by e.g. reading out its key (which is needed for functionality 2).

II. Keeping the configuration data for controlled devices which are already known and retransmitting this data to controlled devices when they have been power cycled (and thus lost their data).

III. Actual 'end-user-visible' control of the controlled device like changing brightness of a light.

These functionalities may be combined in one device, while—in addition, or in alternative—they might be distributed over several elements.

In the illustrated system, the controller device, as a central node, functionality II for a (possibly large) set of controlled devices. Such central node would typically be always powered on and not interact with a user directly.

There might be multitude of devices which can perform functionality I. This could e.g. be QR scanners or smartphone cameras which sends the received information to the central node. Such device typically requires user interaction and only needs to be active at first time configuration.

Another multitude of devices may perform functionality III. These could be the same devices as for functionality II, e.g. a smartphone controlling the lights color via the central controller node. But it could also be a dedicated sensor or switch which communicates through the central node or with the controlled device directly. Such devices typically require user interaction and only need to be active when the user interacts with it. Also, it could be schedules for light control stored e.g. in controller device 21 or central control commands originating outside the devices indicated in FIG. 6 and communicated through e.g. controller device 21.

In a first time setup, relevant information (e.g. ID information and the security key) are obtained from the controlled device in a suitable way (e.g. by means of an app running on a smartphone receiving/decoding e.g. coded light or barcode or NFC) and provided to the controller device (functioning as a central node of the system and as a source of the control data for the controlled devices according to the invention, while it may be noted that the controller device does not necessarily have to be the device functioning as the source of the control data (the source may also be provided in a distributed manner, e.g. control data is provided by the controller device and further units, either redundantly or in cooperation). Every time a controlled device (e.g. lighting device) power cycles it gets its control data (including configuration data) from the central node which does the storage so, after being provided with the control data, the controlled device 'looks like' having this data persistent on the controlled device. The control data includes data needed to be part of a network like a network address and shared network key but might also include application data like last light state. The controlled device may then controlled in ways known from conventional systems, e.g. directly by other devices (e.g. switches and the like) in the network or indirectly via the controller device by other devices outside the network (e.g. a smartphone).

In an implementation, the controlled device is a connected lighting device and has a microprocessor system on chip with a radio, a (volatile) RAM and a (non-volatile) ROM. This ROM stores a software program, which is the same for every light, and a signature, which is unique for every individual light. From this signature at least two items can be derived: a unique identifier and a secret security key, while it is useful to also include an identification of the type of light. This ROM is implemented in at least one of two ways, i.e. as a one-time programmable memory which stores both the program and the signature (giving the advantage that different chips can be used to run different programs), or as a mask ROM which stores the program, supplemented by a small array of fuses which store the signature (giving the advantage that this is the cheapest option for extremely large quantities).

When the lighting device powers up, it always starts with the same behavior (as it has no persistent state) which is to continuously send out a message to indicate it has powered up. This message includes the light device's unique identifier and a random generated number. This message is sent out cycling through all RF channels known by the light after which the light will listen on that channel. This is repeated until it receives a confirmation message. It only accepts a confirmation message which includes the random number and is authenticated with the security key from its signature. This makes sure only someone knowing the lights security key can commission it (the random number prevents replay attacks).

For a first time commissioning, the central node of the lighting system, i.e. the controller device, needs to know which light device to commission and which key to use to talk to it. This is done in this implementation by the owner of the system (the user) transferring the signature from the light to the central node in a secure enough way, i.e. by not openly transmitting it. Two options (while other options are also possible, as discussed above), which are provided as alternatives or in combination, here are by scanning some kind of (QR) code on the light or by some kind of coded light emission (in case of visible coded light this will only be done if after some timeout no bridge has responded). From then on, the central node has stored this information and knows which identifiers are in his network and which keys to use to 'commission' them.

Every time the light device is powered on, the central node will hear the light transmitting the message with its unique identifier and a random number. If the light is known by the central node it will reply with the confirmation message which includes the random number and is authenticated with the lights security key.

From here on, the light will stay in that channel and the more powerful node in the network can transfer the non-volatile data it has stored for the light back to the light. This includes, for example, data needed to be part of a network like a short address, network key, and frame counter; and furthermore data used for light control like scenes, groups or last light state.

It is also foreseen that the transmitted data includes a (small) program which could serve as an extension or replacement of the program it has stored in ROM. When the light wants to persistently store a new value for one of these data items, it will send the new value back to the more powerful node to store it.

This way a light device without any NVRAM (or a reduced amount of NVRAM) can have the same features as a light with (full) NVRAM. Given enough (volatile) RAM and not too high data rates, after the initial exchange, it behaves exactly like a light with (full) NVRAM (which means that it might be compatible with existing systems/standards).

The present invention is not limited to light devices as examples of the controlled device, as a controlled device can be any device in, for example, a smart home/office system and in other contexts.

In the context of light devices, it may further be noted that the invention is not limited to just tunable (e.g. white) lamps or lighting devices, as the invention may also be used, for example, in the control of color LED lamps, as well as other lighting equipment.

The present invention may provide, instead of fully replacing the NVRAM, a remote extension of NVRAM reduced in size and costs.

The 'first time commissioning', discussed above with regard to the exemplary implementation, could also be made safe by only allowing this temporarily triggered by some external input (infrared, power cycle pattern etc.).

For extended security, the security key (e.g. in the signature of the light device) could actually be a public/private key pair, provided the available processing power allows.

It is also possible that some aspects of the control of the operation of the controlled device are carried out outside the controlled device, e.g. an algorithm needed a lot of the processing power (e.g. a color algorithm) can be 'outsourced' to the more powerful node/controller device, using the communication unit for transfer of data.

While the invention has been illustrated and described in detail in the drawings and foregoing description, such illustration and description are to be considered illustrative or exemplary and not restrictive; the invention is not limited to the disclosed embodiments.

Even though preferably the communication unit of the controlled device according to the present invention is providing for wireless communication, e.g. Bluetooth, ZigBee, WiFi, etc., it is also possible to provide in addition or as an alternative a wire-bound communication, e.g. like Powerline communication.

Other variations to the disclosed embodiments can be understood and effected by those skilled in the art in practicing the claimed invention, from a study of the drawings, the disclosure, and the appended claims.

For example, it is possible to operate the invention in an embodiment wherein still some non-volatile random access memory in provided in the controlled device. The invention allows for reducing the need for NVRAM, so that a smaller NVRAM may be provided, while some of the storage capacity of a larger NVRAM is outsourced to the controller device in accordance with the invention.

In the claims, the word "comprising" does not exclude other elements or steps, and the indefinite article "a" or "an" does not exclude a plurality.

A single processor, device or other unit may fulfill the functions of several items or elements recited in the claims. The mere fact that certain measures are recited in mutually different dependent claims does not indicate that a combination of these measures cannot be used to advantage.

Operations like operating, transmitting, receiving, storing, comparing, generating data, and matching data can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A lighting device, comprising:
    a set up processor for carrying out a set up of the lighting device,
    a memory in communication with the processor, the memory comprising identification data which identifies the lighting device,
    a security key,
    a random data generator,
    a communication unit,
    a volatile memory for storing a control data, and
    a controller for controlling, after the set up is completed, an operation of the lighting device in accordance with the control data stored in the volatile memory,
  wherein the set up carried out by the set up processor includes, upon powering up of the lighting device:
    continuously sending out a message, cycling through all RF channels known by the lighting device, the message comprising the identification data and a random generated number, generated by the random data generator, the message indicating power up of the lighting device;
    receiving, while listening on the RF channel through which the message has been sent, a confirmation message;
    accepting, only when the confirmation message includes the random generated number and is authenticated with the security key of the lighting device, the confirmation message;
    receiving, while staying in the RF channel in which the accepted confirmation message is received, the control data, comprising a short address, network key, frame counter and data used for light control, via the communication unit; and
    storing the received control data in the volatile memory.

2. The lighting device according to claim 1,
  wherein the set up carried out by the set up processor further includes:
    checking whether all the control data is received and, if all the control data is stored in the volatile memory, passing on control of the lighting device to the controller.

3. The lighting device according to claim 2,
  wherein the set up carried out by the set up processor includes transmitting type information indicating a type of the lighting device together with the identification data.

4. The lighting device according to claim 1,
  wherein the receiving of the control data includes receiving data and identification information from a source, wherein the set up processor stores the received data as the control data in the volatile memory in case the identification information and the identification data match.

5. The lighting device according to claim 1, wherein the identification data is unique to the lighting device.

6. The lighting device according to claim 1, wherein the set up processor includes a microprocessor and a non-volatile read-only memory storing a set up program to be carried out by the microprocessor.

7. The lighting device according to claim 6, wherein the read-only memory includes a one-time programmable memory and/or a mask ROM.

8. The lighting device according to claim 6, wherein the identification data is stored in the read-only memory.

9. The lighting device according to claim 1, wherein the lighting device comprises a lighting unit, wherein the set up carried out by the set up processors includes, prior to receiving the control data, transmitting the identification data by a coded light emission of the lighting unit.

10. A system, comprising:
at least one lighting device according to claim 1, and
a source for transmitting the control data to the lighting device.

11. The system according to claim 10, wherein the source is provided with a reader for reading identification information and/or a security key from the controlled device.

12. A method for setting up a lighting device,
the lighting device comprising a set up processor, identification data which identifies the lighting device, a security key, a random data generator, a communication unit, a volatile memory for storing a control data, wherein the control data stored in the volatile memory is used by a controller of the lighting device, after the set up is completed, for controlling an operation of the lighting device,
the method comprising, as steps carried out by the set up processor (3, 3'), upon powering up of the lighting device:
  continuously sending out a message, cycling through all RF channels known by the lighting device, the message comprising the identification data and a random generated number, generated by the random data generator, the message indicating power up of the lighting device;
  receiving, while listening on the RF channel through which the message has been sent, a confirmation message;
  accepting, only when the confirmation message includes the random generated number and is authenticated with the security key of the lighting device, the confirmation message;
  receiving, while staying in the RF channel in which the accepted confirmation message is received, the control data, comprising a short address, network key, frame counter and data used for light control, via the communication unit, and
  storing the received control data in the volatile memory.

13. A non-transitory computer-readable medium comprising software product for carrying out a set up process of a lighting device, the software product comprising program code causing a set up processor to carry out the steps of the method as claimed in claim 12 when the software product is run on the set up processor of the lighting device.

* * * * *